US012025077B2

United States Patent
Lee et al.

(10) Patent No.: US 12,025,077 B2
(45) Date of Patent: Jul. 2, 2024

(54) COMBUSTOR INCLUDING HEAT EXCHANGE STRUCTURE AND ROCKET COMPRISING SAME

(71) Applicant: KOREA AEROSPACE RESEARCH INSTITUTE, Daejeon (KR)

(72) Inventors: Keum-Oh Lee, Daejeon (KR); Byoungjik Lim, Daejeon (KR); Soon-Young Park, Sejong-si (KR)

(73) Assignee: KOREA AEROSPACE RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 18/251,617

(22) PCT Filed: Nov. 4, 2021

(86) PCT No.: PCT/KR2021/015864
§ 371 (c)(1),
(2) Date: May 3, 2023

(87) PCT Pub. No.: WO2022/108197
PCT Pub. Date: May 27, 2022

(65) Prior Publication Data
US 2023/0407820 A1   Dec. 21, 2023

(30) Foreign Application Priority Data
Nov. 18, 2020 (KR) .................. 10-2020-0154546

(51) Int. Cl.
*F02K 9/62* (2006.01)
*F02K 9/44* (2006.01)
(Continued)

(52) U.S. Cl.
CPC .................. *F02K 9/62* (2013.01); *F02K 9/44* (2013.01); *F02K 9/64* (2013.01); *F02K 9/972* (2013.01); *F23R 3/005* (2013.01)

(58) Field of Classification Search
CPC ..... F02K 9/44; F02K 9/62; F02K 9/64; F02K 9/972; F23R 3/005; F05D 2240/35; F05D 2260/20; F28D 7/0066
See application file for complete search history.

(56) References Cited

U.S. PATENT DOCUMENTS 3,004,386 A * 10/1961 Ledwith .................. F02K 9/972
239/127.1
3,043,103 A *  7/1962 Dent ....................... F02K 9/972
165/169

(Continued)

FOREIGN PATENT DOCUMENTS

JP      2007023135      2/2007
JP      2019015180      1/2019
(Continued)

OTHER PUBLICATIONS

Korean International Search Report for application No. PCT/KR2021/015864 dated Feb. 18, 2022.

*Primary Examiner* — William H Rodriguez
(74) *Attorney, Agent, or Firm* — Perman & Green, LLP

(57) ABSTRACT

The disclosure relates to a combustor including a heat exchange structure and a rocket including the combustor. The combustor according to an embodiment of the disclosure includes: an inner wall; an outer jacket arranged to cover an outer surface of the inner wall; a plurality of first heat exchange channels arranged between the inner wall and the outer jacket and through which a fuel introduced from a fuel tank flows; and a second heat exchange channel arranged between the inner wall and the outer jacket and through which a pressurized gas introduced from a pressurized gas tank flows.

14 Claims, 9 Drawing Sheets

(51) Int. Cl.
  *F02K 9/64* (2006.01)
  *F02K 9/97* (2006.01)
  *F23R 3/00* (2006.01)

(56) References Cited

U.S. PATENT DOCUMENTS

| | | | | |
|---|---|---|---|---|
| 3,086,358 | A * | 4/1963 | Tumavicus | F02K 9/972 165/169 |
| 3,154,914 | A * | 11/1964 | Stockel | F02K 9/64 60/260 |
| 3,177,935 | A * | 4/1965 | Rosman | F02K 9/64 165/172 |
| 3,190,070 | A * | 6/1965 | Neu, Jr. | F02K 9/64 239/127.1 |
| 3,235,947 | A * | 2/1966 | Sohlemann | F02K 9/64 228/183 |
| 3,349,464 | A * | 10/1967 | Becker, Jr. | F02K 9/64 29/421.2 |
| 3,644,974 | A * | 2/1972 | Simon | F02K 9/64 239/265.11 |
| 3,690,103 | A * | 9/1972 | Dederra | F02K 9/64 165/169 |
| 3,692,637 | A * | 9/1972 | Dederra et al. | F02K 9/64 29/DIG. 12 |
| 3,780,533 | A * | 12/1973 | Huang | F02K 9/64 60/260 |
| 3,897,316 | A * | 7/1975 | Huang | F02K 9/64 29/455.1 |
| 4,107,919 | A * | 8/1978 | Sokolowski | F28F 3/086 165/169 |
| 4,199,937 | A * | 4/1980 | Fortini | F02K 9/64 239/127.1 |
| 5,075,966 | A * | 12/1991 | Mantkowski | C23C 28/00 29/458 |
| 5,154,352 | A * | 10/1992 | Buckreus | F02K 9/972 60/770 |
| 5,233,755 | A | 8/1993 | Vandendriessche | |
| 5,375,325 | A * | 12/1994 | Bales | B23P 15/008 29/890.038 |
| 5,473,817 | A * | 12/1995 | Schnoor | B23P 15/008 29/890.01 |
| 5,865,030 | A * | 2/1999 | Matsuhama | F02C 7/224 60/737 |
| 6,182,442 | B1 * | 2/2001 | Schmidt | F02K 9/64 239/127.3 |
| 6,467,253 | B1 * | 10/2002 | Haggander | F02K 9/972 165/169 |
| 9,822,654 | B2 | 11/2017 | Brandl et al. | |
| 11,525,420 | B2 | 12/2022 | Goetz et al. | |
| 2004/0139721 | A1 * | 7/2004 | Haggander | F02K 9/48 60/39.15 |
| 2005/0188678 | A1 * | 9/2005 | Haggander | F02K 9/343 60/266 |
| 2009/0288390 | A1 * | 11/2009 | Pavia | F02K 9/64 60/267 |
| 2010/0037589 | A1 | 2/2010 | Haggander et al. | |
| 2010/0170260 | A1 * | 7/2010 | Mawatari | F23R 3/06 60/755 |
| 2011/0192137 | A1 * | 8/2011 | Maeding | B23P 15/008 29/890.01 |
| 2012/0144797 | A1 | 6/2012 | Dobek et al. | |
| 2013/0098063 | A1 * | 4/2013 | Mizukami | F23R 3/06 60/785 |
| 2014/0216043 | A1 * | 8/2014 | Cai | F23R 3/005 60/755 |
| 2014/0260278 | A1 * | 9/2014 | Hughes | F23R 3/005 60/752 |
| 2019/0072053 | A1 * | 3/2019 | Bagaveyev | F02C 7/22 |
| 2020/0011275 | A1 * | 1/2020 | Biblarz | F02K 9/42 |
| 2023/0125860 | A1 * | 4/2023 | Tamemasa | F02K 9/64 60/266 |
| 2023/0160574 | A1 * | 5/2023 | Binek | F01D 9/023 60/740 |

FOREIGN PATENT DOCUMENTS

| | | |
|---|---|---|
| JP | 2020033994 | 3/2020 |
| KR | 100925541 | 11/2009 |
| KR | 20150042137 | 4/2015 |

* cited by examiner

COMBUSTOR INCLUDING HEAT EXCHANGE STRUCTURE AND ROCKET COMPRISING SAME

CROSS-REFERENCE TO RELATED APPLICATIONS

This application is a National Stage of International Application No. PCT/KR2021/015864 having an International Filing Date of 4 Nov. 2021, which designated the United States of America, and which International Application was published under PCT Article 21(2) as WO Publication No. 2022/108197 A1, which claims priority from and the benefit of Korean Patent Application No. 10-2020-0154546, filed on 18 Nov. 2020, the disclosures of which are incorporated herein by reference in their entireties.

TECHNICAL FIELD

The disclosure relates to a combustor and a rocket including the same, and more particularly, to a combustor including a heat exchange structure for heating a pressurized gas and cooling the combustor, and a rocket including the combustor.

BACKGROUND ART

A rocket engine is a device that obtains a propelling force by discharging a high-temperature/high-pressure gas and flames by combusting a propellant. Thus, as the combustion continues, the temperature of the engine increases, and in order to increase the combustion efficiency, a system for cooling the high temperature combustor is required.

A method of cooling the combustor of the rocket engine may include film cooling, according to which cooling is performed by injecting a fluid having a relatively lower temperature than the combustor, cooling using an ablative material, discharge cooling, infiltration cooling, radiational cooling, or a heat shield method using coating.

Of these various cooling methods, regenerative cooling is a method of cooling an inner wall surface by moving a portion or the entirety of a propellant flowing by being pressurized by a pump, along a cooling channel of a thrust chamber of a combustor. That is, according to the regenerative cooling, the combustor is cooled by using the propellant having a relatively lower temperature than the combustor.

In an engine using a bipropellant, which is implemented in most rockets, a fuel and an oxidizer are used as the propellant. With respect to a bipropellant rocket, according to the regenerative cooling according to the related art, a thrust chamber of a combustor is cooled by using only a fuel, and thus, sometimes it may be difficult to sufficiently cool the thrust chamber of the combustor. In order to solve this problem, a film cooling portion may be arranged at a portion of the thrust chamber of the combustor to perform cooling that passes the fuel. However, film cooling may decrease the combustion efficiency of the combustor, and thus, the overall efficiency of the engine may be decreased.

Meanwhile, an inert gas, such as helium, etc., is used to pressurize a propellant based on a predetermined pressure. The rocket engine according to the related art may provide, at a turbine exhaust portion, a heat exchanger configured to heat helium to have a pressure that is equal to or greater than a predetermined pressure. However, a turbine exhaust gas has a relatively low temperature, and thus, in order to sufficiently heat helium, a shape of the heat exchanger may become complex to have an increased weight, and thus, the overall weight of the rocket engine may be increased.

The background art described above corresponds to technical information contained by the inventor to derive the disclosure or acquired in the process of deriving the disclosure and may not necessarily correspond to the well-known art publicly known before the application of the disclosure.

DISCLOSURE

Technical Problem

The disclosure aims to solve the problems described above. According to the disclosure, there is provided a combustor for not only efficiently cooling a combustor, but also efficiently heating a pressurized gas for pressurizing a propellant, via regenerative cooling, and a rocket including the combustor.

However, this objective is only an example, and the objective to be solved by the disclosure is not limited thereto.

Technical Solution

A combustor according to an embodiment of the disclosure includes: an inner wall; an outer jacket arranged to cover an outer surface of the inner wall; a plurality of first heat exchange channels arranged between the inner wall and the outer jacket and through which a fuel introduced from a fuel tank flows; and a second heat exchange channel arranged between the inner wall and the outer jacket and through which a pressurized gas introduced from a pressurized gas tank flows.

The first heat exchange channel may include: a first inlet portion through which the fuel from the fuel tank is introduced; a first outlet portion through which the fuel which is introduced from the first inlet portion and cooled is discharged; and a first heat exchange portion extending between the first inlet portion and the first outlet portion and at which a heat exchange is performed between the fuel and the combustor.

The first heat exchange channel may have a shape in which a cross-sectional area of the first heat exchange channel is increased toward an outer circumferential surface of the inner wall.

The second heat exchange channel may include: a second inlet portion through which the pressurized gas from the pressurized gas tank is introduced; a second outlet portion through which the pressurized gas which is introduced from the second inlet portion and heated is discharged; and a second heat exchange portion extending between the second inlet portion and the second outlet portion and at which a heat exchange is performed between the pressurized gas and the combustor.

The second heat exchange portion may include: a plurality of heating portions extending from the second inlet portion and through which the pressurized gas flows; and a return portion arranged at an end of at least one of the plurality of heating portions and returning a moving direction of the pressurized gas to an opposite direction.

The second heat exchange portion may include: a first heating portion extending in a first direction from the second inlet portion; a first return portion arranged at an end of the first heating portion and returning the pressurized gas to an opposite direction; and a second heating portion extending in the first direction from the first return portion and connected to the second outlet portion.

The first heating portion and the second heating portion may be arranged to be apart from each other to form separate fluid passages and to be symmetrical with each other with respect to a center of the first return portion.

The second heat exchange portion may include: a first heating portion extending in a first direction from the second inlet portion; a first return portion arranged at an end of the first heating portion and returning the pressurized gas to an opposite direction; a second heating portion extending in the first direction from the first return portion; a second return portion arranged at an end of the second heating portion and returning the pressurized gas to an opposite direction; a third heating portion extending in the first direction from the second return portion and connected to the second outlet portion; a third return portion arranged at an end of the third heating portion and returning the pressurized gas to an opposite direction; and a fourth heating portion extending in the first direction from the third return portion and connected to the second outlet portion.

The first heating portion, the second heating portion, the third heating portion, and the fourth heating portion may be arranged to be apart from each other to form separate fluid passages.

The second heat exchange channel may have a shape in which a cross-sectional area of the second heat exchange channel is increased toward an inner circumferential surface of the outer jacket.

The first heat exchange channel and the second heat exchange channel may be alternately arranged with each other in a circumferential direction of the inner wall.

A rocket according to another embodiment of the disclosure includes an oxidant tank storing an oxidant, a fuel tank storing a fuel, a pressurized gas tank arranged in at least one of the oxidant tank and the fuel tank and storing a pressurized gas, and a combustor, wherein the combustor includes: an inner wall; an outer jacket arranged to cover an outer surface of the inner wall; a plurality of first heat exchange channels arranged between the inner wall and the outer jacket, through which the fuel introduced from the fuel tank flows, and through which the fuel exchanging heat with the combustor is discharged to the fuel tank; and a second heat exchange channel arranged between the inner wall and the outer jacket, through which the pressurized gas introduced from the pressurized gas tank flows, and through which the pressurized gas exchanging heat with the combustor is discharged to the pressurized gas tank.

The first heat exchange channel may include: a first inlet portion through which the fuel from the fuel tank is introduced; a first outlet portion through which the fuel which is introduced from the first inlet portion and cooled is discharged; and a first heat exchange portion extending between the first inlet portion and the first outlet portion and at which a heat exchange is performed between the fuel and the combustor.

The first heat exchange channel may have a shape in which a cross-sectional area of the first heat exchange channel is increased toward an outer circumferential surface of the inner wall.

The second heat exchange channel may include: a second inlet portion through which the pressurized gas from the pressurized gas tank is introduced; a second outlet portion through which the pressurized gas which is introduced from the second inlet portion and heated is discharged; and a second heat exchange portion extending between the second inlet portion and the second outlet portion and at which a heat exchange is performed between the pressurized gas and the combustor.

The second heat exchange portion may include: a plurality of heating portions extending from the second inlet portion and through which the pressurized gas flows; and a return portion arranged at an end of at least one of the plurality of heating portions and returning a moving direction of the pressurized gas to an opposite direction.

The second heat exchange portion may include: a first heating portion extending in a first direction from the second inlet portion; a first return portion arranged at an end of the first heating portion and returning the pressurized gas to an opposite direction; and a second heating portion extending in the first direction from the first return portion and connected to the second outlet portion.

The first heating portion and the second heating portion may be arranged to be apart from each other to form separate fluid passages and to be symmetrical with each other with respect to a center of the first return portion.

The second heat exchange portion may include: a first heating portion extending in a first direction from the second inlet portion; a first return portion arranged at an end of the first heating portion and returning the pressurized gas to an opposite direction; a second heating portion extending in the first direction from the first return portion; a second return portion arranged at an end of the second heating portion and returning the pressurized gas to an opposite direction; a third heating portion extending in the first direction from the second return portion and connected to the second outlet portion; a third return portion arranged at an end of the third heating portion and returning the pressurized gas to an opposite direction; and a fourth heating portion extending in the first direction from the third return portion and connected to the second outlet portion.

The first heating portion, the second heating portion, the third heating portion, and the fourth heating portion may be arranged to be apart from each other to form separate fluid passages.

The second heat exchange channel may have a shape in which a cross-sectional area of the second heat exchange channel is increased toward an inner circumferential surface of the outer jacket.

The first heat exchange channel and the second heat exchange channel may be alternately arranged with each other in a circumferential direction of the inner wall.

The above and other aspects, features, and advantages of certain embodiments of the disclosure will be more apparent from the following description taken in conjunction with the detailed description, claims, and accompanying drawings.

Advantageous Effects

According to a combustor and a rocket including the same according to an embodiment of the disclosure, a heat exchange may be performed between a fuel and a pressurized gas, and the combustor, to cool the combustor, and at the same time, the pressurized gas may be heated to a high temperature. Accordingly, the pressure of an oxidant tank and a fuel tank may be maintained by using the high-pressure pressurized gas.

According to the combustor and the rocket including the same according to an embodiment of the disclosure, the pressurized gas may be efficiently heated without including an additional heat exchanger for heating the pressurized gas.

BEST MODE

Figure 1:
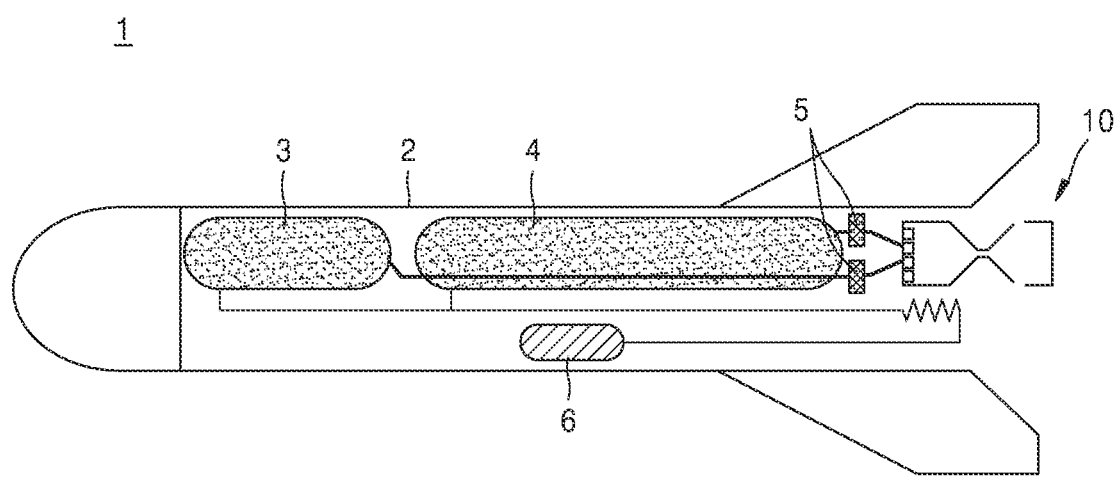
FIG. 1 illustrates a rocket including a combustor according to an embodiment of the disclosure.

A combustor according to an embodiment of the disclosure includes: an inner wall; an outer jacket arranged to cover an outer surface of the inner wall; a plurality of first heat exchange channels arranged between the inner wall and the outer jacket and through which a fuel introduced from a fuel tank flows; and a second heat exchange channel arranged between the inner wall and the outer jacket and through which a pressurized gas introduced from a pressurized gas tank flows.

Mode for Invention

While the disclosure is capable of various modifications and alternative forms, embodiments thereof are shown by way of example in the drawings and will herein be described in detail. However, it shall be understood that the disclosure is not limited to the one or more embodiments, and all modifications, equivalents, and substitutes encompassed by the concept and the technical range of the disclosure are included in the disclosure. When describing the disclosure, the same components are indicated by using the same reference numerals, although the components are illustrated according to a different embodiment.

Hereinafter, embodiments of the disclosure will be described in detail by referring to the accompanying drawings. In descriptions with reference to the drawings, the same reference numerals are given to elements that are the same or substantially the same and descriptions will not be repeated.

It will be understood that although the terms "first," "second," etc. may be used herein to describe various components, these components should not be limited by these terms. These components are only used to distinguish one component from another.

As used herein, the singular expressions "a," "an," and "the" are intended to include the plural forms as well, unless the context clearly indicates otherwise.

It will be further understood that the terms "comprises" and/or "comprising" used herein specify the presence of stated features or components, but do not preclude the presence or addition of one or more other features or components.

Sizes of elements in the drawings may be exaggerated for convenience of explanation. For example, sizes and thicknesses of the elements in the drawings are randomly indicated for convenience of explanation, and thus, the disclosure is not necessarily limited to the illustrations of the drawings.

In the embodiments hereinafter, the x-axis, the y-axis and the z-axis are not limited to three axes of the rectangular coordinate system, and may be interpreted in a broader sense. For example, the x-axis, the y-axis, and the z-axis may be perpendicular to one another, or may represent different directions that are not perpendicular to one another.

When a certain embodiment may be implemented differently, a specific process order may be performed differently from the described order. For example, two consecutively described processes may be performed substantially at the same time or performed in an order opposite to the described order.

Terms used in the present application are used only for describing particular embodiments of the disclosure and are not intended to limit the disclosure. With respect to the present application, it will be further understood that the terms "comprises" or "comprising" used herein specify the presence of stated features, integers, steps, operations, members, components, and/or groups thereof, but do not preclude the presence or addition of one or more other features, integers, steps, operations, members, components, and/or groups thereof.

Figure 2:
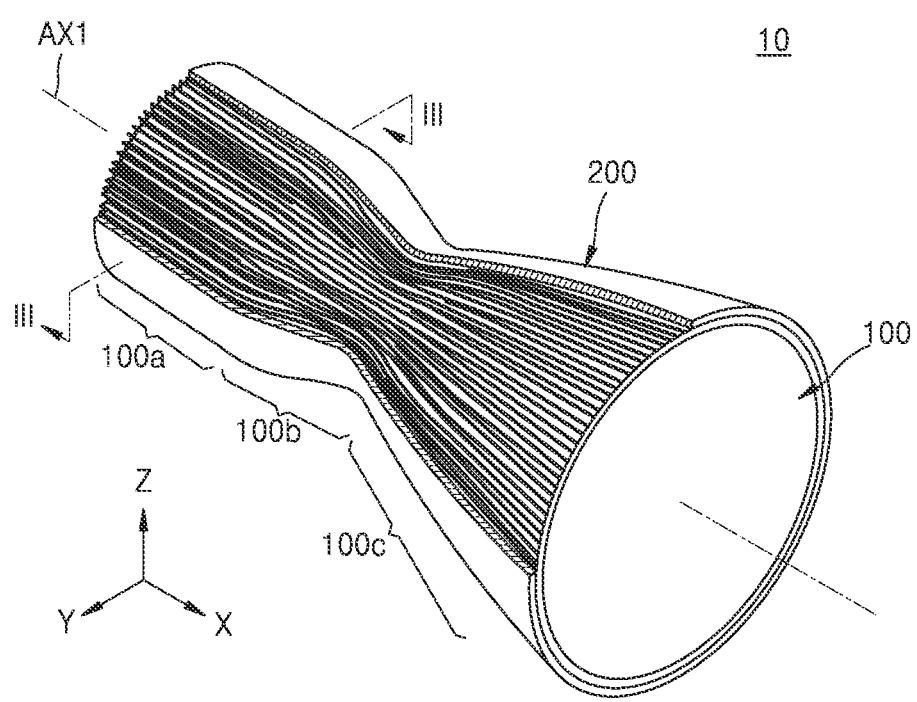
FIG. 2 illustrates a combustor according to a first embodiment of the disclosure.
Figure 3:
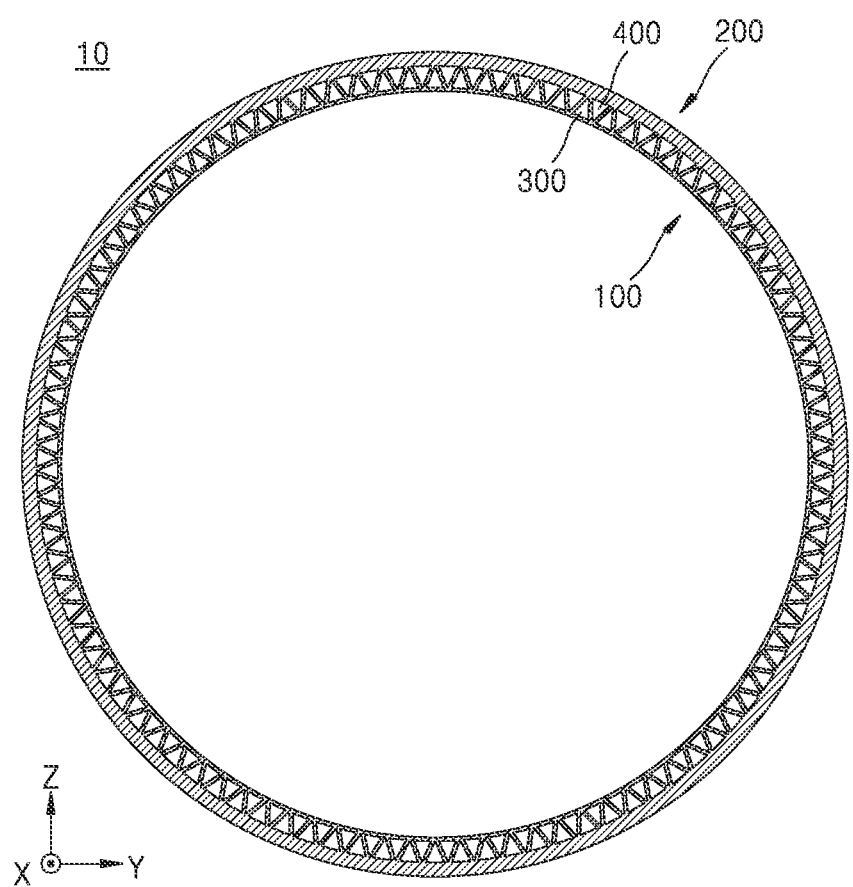
FIG. 3 illustrates enlarged region III of FIG. 2.
Figure 4:
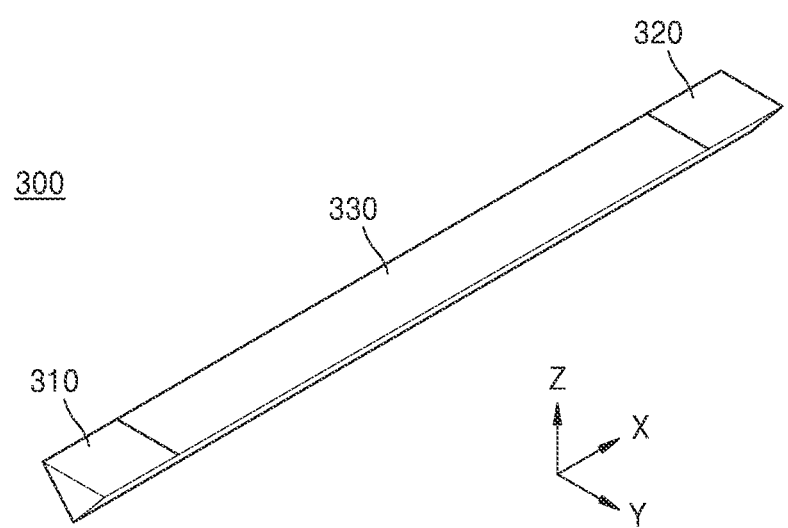
FIG. 4 illustrates an enlarged first heat exchange channel according to the first embodiment of the disclosure.
Figure 5:
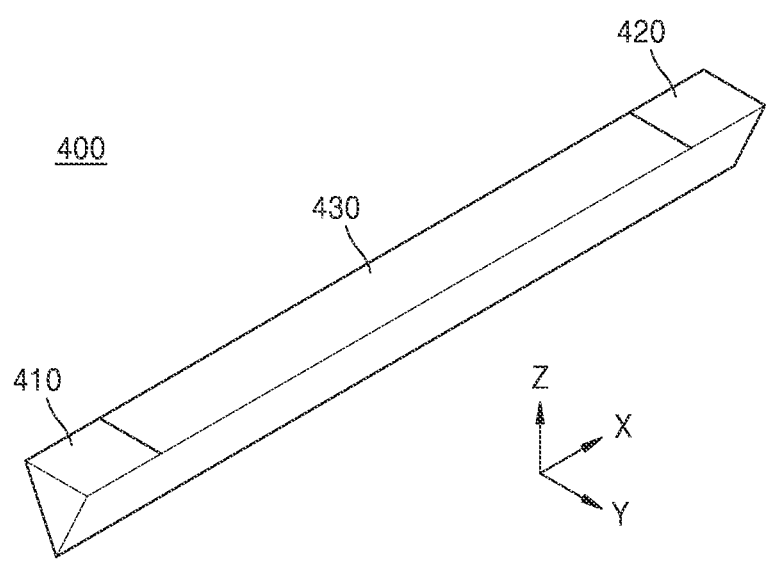
FIG. 5 illustrates an enlarged second heat exchange channel according to the first embodiment of the disclosure.

FIG. 1 illustrates a rocket 1 including a combustor 10 according to an embodiment of the disclosure. FIG. 2 illustrates the combustor 10 according to a first embodiment of the disclosure. FIG. 3 illustrates enlarged region III of FIG. 2. FIG. 4 illustrates an enlarged first heat exchange channel 300 according to the first embodiment of the disclosure. FIG. 5 illustrates an enlarged second heat exchange channel 400 according to the first embodiment of the disclosure.

The rocket 1 according to an embodiment of the disclosure is propelled by using a fuel and an oxidant.

Referring to FIG. 1, the rocket 1 may include a main body 2, an oxidant tank 3, a fuel tank 4, a pressurized gas tank 5, a pump 6, and the combustor 10.

The main body 2 may form a frame of the rocket 1 and may fix and/or support other components of the rocket 1, which are arranged in the main body 2. The main body 2 may have a general shape of the rocket 1. For example, the main body 2 may linearly extend in a lengthwise direction and may have an end having a streamlined shape.

The oxidant tank 3 may be arranged at a side in the rocket 1 and may store an oxidant. The stored oxidant may be supplied to the combustor 10. According to an embodiment, the oxidant may be liquid oxygen.

The fuel tank 4 may be arranged at another side in the rocket 1 and may store a fuel. The stored fuel may be supplied to the combustor 10. According to an embodiment, the fuel may be liquid hydrogen or liquid methane, which is a kind of ultra-low temperature fuel.

The pressurized gas tank 5 may supply a pressurized gas to the oxidant tank 3 and/or the fuel tank 4, and thus, the internal pressure of the oxidant tank 3 and/or the fuel tank 4 may be maintained at a constant level. For example, when the oxidant and the fuel are consumed as the rocket 1 is propelled, empty spaces may occur in the oxidant tank 3 and the fuel tank 4 so that the oxidant and the fuel may expand, to decrease the pressure and the temperature. Thus, as the internal pressure of the oxidant tank 3 and the fuel tank 4 may be decreased to be lower than the ambient pressure, damage may occur due to the external pressure. In order to prevent this phenomenon, the pressurized gas from the pressurized gas tank 5 may be supplied to the oxidant tank 3 and/or the fuel tank 4, in order to maintain the internal pressure at a constant level. According to an embodiment, the pressurized gas may be helium gas.

According to an embodiment of the disclosure, the pressurized gas tank 5 may have a pipe connected to the oxidant tank 4 and/or the fuel tank 4, and the pipe may have an area to perform a heat exchange with the combustor 10. This aspect will be described below.

The pump 6 may be connected to the oxidant tank 3 and the fuel tank 4 and may supply the oxidant and the fuel to the combustor 10 by pressurizing the oxidant and the fuel.

The combustor 10 may be arranged at a side of the rocket 1 and may generate a propelling force. For example, as illustrated in FIG. 1, the combustor 10 may be arranged at a rear end of the rocket 1 and may combust the supplied fuel and oxidant and discharge the combusted fuel and oxidant at a high speed to obtain the propelling force.

Referring to FIGS. 2 to 5, the combustor 10 according to the first embodiment of the disclosure may include an inner wall 100, an outer jacket 200, a first heat exchange channel 300, and a second heat exchange channel 400.

The inner wall 100 may be arranged at an inner side of the combustor 10 and may have an inner space. According to an embodiment, the inner wall 100 may be a liner of the combustor 10, and the oxidant and the fuel may be combusted in the inner space of the inner wall 100.

According to an embodiment, the inner wall 100 may include an introduction portion 100a through which the fuel and the oxidant are introduced, a discharge portion 100c through which the combusted fuel and oxidant are discharged, and a collector portion 100b arranged between the introduction portion 100a and the discharge portion 100c.

According to an embodiment, the introduction portion 100a may have a cylindrical shape and may extend straight in a first direction (for example, an X-axis direction of FIG. 2) along a central axis AX1 of the inner wall 100. That is, the introduction portion 100a may have a constant diameter. According to an embodiment, the discharge portion 100c have a shape of a truncated cone and may have a diameter increased in an exit direction. According to an embodiment, the collector portion 100b may have at least one inflection point of a diameter in a lengthwise direction. Also, the inflection point may correspond to a throat of the combustor 10.

The outer jacket 200 may be arranged to cover an outer surface of the inner wall 100. For example, as illustrated in FIGS. 2 and 3, the outer jacket 200 may have a shape corresponding to the inner wall 100 and may be arranged to be apart from the outer surface of the inner wall 100 by a predetermined distance to surround the inner wall 100.

The first heat exchange channel 300 may be arranged between the inner wall 100 and the outer jacket 200 and may exchange heat with the combustor 10. In more detail, as illustrated in FIGS. 2 and 3, the first heat exchange channel 300 may be arranged between an outer circumferential surface of the inner wall 100 and an inner circumferential surface of the outer jacket 200, and the fuel supplied from the fuel tank 4 may flow through the first heat exchange channel 300.

The fuel supplied from the fuel tank 4 may have a relatively lower temperature than the combustor 10 performing combustion. Thus, the fuel flowing through the first heat exchange channel 300 may absorb heat from the high-temperature combustor 10 to cool the combustor 10.

According to an embodiment, the first heat exchange channel 300 may be entirely arranged in a lengthwise direction of the combustor 10. According to another embodiment, the first heat exchange channel 300 may be partially arranged at a position corresponding to the introduction portion 100a of the inner wall 100.

According to an embodiment, the first heat exchange channel 300 may be arranged in plural in a circumferential direction of the combustor 10.

Sizes and shapes of the first heat exchange channel 300 are not particularly limited. According to an embodiment, as illustrated in FIG. 4, the first heat exchange channel 300 may have a shape in which a cross-sectional area of the first heat exchange channel 300 is increased toward an outer circumferential surface of the inner wall 100.

For example, the first heat exchange channel 300 may have a triangular cross-section and may have one side that is toward the outer circumferential surface of the inner wall 100. Accordingly, a heat exchange area between the inner wall 100 and the first heat exchange channel 300 may be increased, and thus, the combustor 10 may be efficiently cooled.

According to an embodiment, the first heat exchange channel 300 may include a first inlet portion 310, a first outlet portion 320, and a first heat exchange portion 330.

In more detail, as illustrated in FIG. 4, the first inlet portion 310 may be arranged at a side of the first heat exchange channel 300, and the fuel from the fuel tank 4 may flow into the first inlet portion 310. Although not shown in the drawing, a manifold (not shown) through which the fuel supplied from the fuel tank 4 may pass into the first heat exchange channel 300 may be arranged at an outer side of the outer jacket 200. The first inlet portion 310 may be connected to the manifold and may transfer the supplied fuel to the first heat exchange portion 330.

The first heat exchange portion 330 may extend from the first inlet portion 310 in a first direction (for example, an X-axis direction of FIG. 4). For example, the first heat exchange portion 330 may be arranged in parallel with the central axis AX1 so that the fuel introduced from the first inlet portion 310 arranged at the one side may exchange heat with the combustor 10 along the outer circumferential surface of the inner wall 100.

The first outlet portion 320 may be arranged at another side of the first heat exchange portion 330 and may discharge the fuel that is transferred through the first heat exchange portion 330 to cool the combustor 10. According to an embodiment, the discharged fuel may be injected to an injection surface of the combustor 10.

The second heat exchange channel 400 may be arranged between the inner wall 100 and the outer jacket 200 and may exchange heat with the combustor 10. In more detail, as illustrated in FIGS. 2 and 3, the second heat exchange channel 400 may be arranged between the outer circumferential surface of the inner wall 100 and the inner circumferential surface of the outer jacket 200, and the pressurized gas supplied from the pressurized gas tank 5 may flow through the second heat exchange channel 400. The pressurized gas supplied from the pressurized gas tank 5 may have a relatively lower temperature, and thus, a heat exchange with the combustor 10 may be performed through the second heat exchange channel 400 in order to heat the pressurized gas.

In order to maintain the internal pressure of the oxidant tank 3 or the fuel tank 4 at a constant level, a high-pressure pressurized gas may have to be supplied. According to the related art, in order to increase the pressure of the pressurized gas, the pressurized gas may be heated by using a heat exchanger mounted on a turbine exhaust portion. Gas exhausted from the turbine exhaust portion may have a relatively lower temperature, and thus, the heat exchanger may have to have a relatively complex shape, to increase the weight of the heat exchanger and raise the cost of engine manufacturing.

According to the combustor 10 according to the first embodiment of the disclosure, the second heat exchange channel 400 may be arranged in the combustor 10 to heat the pressurized gas, without additionally including a heat exchanger for exchanging heat with the pressurized gas. Therefore, while minimizing the increase of the weight and the cost of the engine, a high-temperature/high-pressure pressurized gas may be supplied to the oxidant tank 3 and/or the fuel tank 4.

According to an embodiment, the second heat exchange channel 400 may be entirely arranged in a lengthwise direction of the combustor 10. According to another embodiment, the second heat exchange channel 400 may be partially arranged at a position corresponding to the introduction portion 100a of the inner wall 100. Alternatively, the second heat exchange channel 400 may be arranged to overlap the first heat exchange channel 300 in the lengthwise direction of the combustor 10.

According to an embodiment, the second heat exchange channel 400 may be arranged in plural in a circumferential direction of the combustor 10. In more detail, as illustrated in FIG. 3, the second heat exchange channel 400 may be alternately arranged with the first heat exchange channel 300 in a circumferential direction of the inner wall 100.

According to an embodiment, the second heat exchange channel 400 may have a shape in which the second heat exchange channel 400 has an increased cross-sectional area toward the inner circumferential surface of the outer jacket 200. For example, the second heat exchange channel 400 may have a triangular cross-section and may have a side that is toward the inner circumferential surface of the outer jacket 200. Accordingly, a heat exchange area between the outer jacket 200 and the second heat exchange channel 400 may be increased, to efficiently increase the temperature of the pressurized gas.

According to an embodiment, the second heat exchange channel 400 may include a second inlet portion 410, a second outlet portion 420, and a second heat exchange portion 430.

In more detail, as illustrated in FIG. 5, the second inlet portion 410 may be arranged at a side of the second heat exchange channel 400, and the pressurized gas from the pressurized gas tank 5 may flow into the second inlet portion 410. Although not shown in the drawing, a manifold (not shown) through which the pressurized gas supplied from the pressurized gas tank 5 may pass into the second heat exchange channel 400 may be arranged at an outer side of the outer jacket 200. The second inlet portion 410 may be connected to the manifold and may transfer the supplied pressurized gas to the second heat exchange portion 430.

The second heat exchange portion 430 may extend from the second inlet portion 410 in a first direction (for example, an X-axis direction of FIG. 5). For example, the second heat exchange portion 430 may be arranged in parallel with the central axis AX1 so that the pressurized gas introduced from the second inlet portion 410 arranged at the one side may exchange heat with the combustor 10 along the inner circumferential surface of the outer jacket 200.

The second outlet portion 420 may be arranged at another side of the second heat exchange portion 430 and may discharge the pressurized gas that is transferred through the second heat exchange portion 430 and receives heat from the combustor 10 to be heated. According to an embodiment, the discharged pressurized gas may be supplied to the oxidant tank 3 and/or the fuel tank 4 through an additional fluid passage.

Based on this structure, the combustor 10 and the rocket 1 including the same according to the first embodiment of the disclosure may cool the combustor 10 while heating the pressurized gas, without including a heat exchanger having a complex structure.

According to an embodiment, the combustor 10 according to the first embodiment of the disclosure may be integrally formed. In more detail, all of the inner wall 100, the outer jacket 200, the first heat exchange channel 300, and the second heat exchange channel 400 may be integrally formed with each other by being stacked through a three-dimensional (3D) printer.

According to an embodiment, the first heat exchange channel 300 and/or the second heat exchange channel 400 may be entirely arranged in the lengthwise direction of the combustor 10 or may be arranged at a portion of the combustor 10. For example, the first heat exchange channel 300 and/or the second heat exchange channel 400 may extend between the introduction portion 100a and the discharge portion 100c of the inner wall 100. Also, the first inlet portion 310 of the first heat exchange channel 300 and the second inlet portion 410 of the second heat exchange channel 400 may be arranged at the side of the introduction portion 100a, and the first outlet portion 320 and the second outlet portion 420 may be arranged at the side of the discharge portion 100c. Accordingly, the fuel and the pressurized gas may be introduced from an upper portion of the combustor 10 and discharged to a lower portion of the combustor 10.

According to an embodiment, the first heat exchange channel 300 and/or the second heat exchange channel 400 may be arranged only at a straight area of the combustor 10. In more detail, the first heat exchange channel 300 and/or the second heat exchange channel 400 may be arranged at the introduction portion 100a of the inner wall 100. Also, the first inlet portion 310 of the first heat exchange channel 300 and the second inlet portion 410 of the second heat exchange channel 400 may be arranged at an upper end of the introduction portion 100a, and the first outlet portion 320 and the second outlet portion 420 may be arranged at a lower end of the introduction portion 100a. Accordingly, the fuel and the pressurized gas may be introduced from an upper portion of the introduction portion 100a and discharged to a lower portion of the introduction portion 100a.

Figure 6:
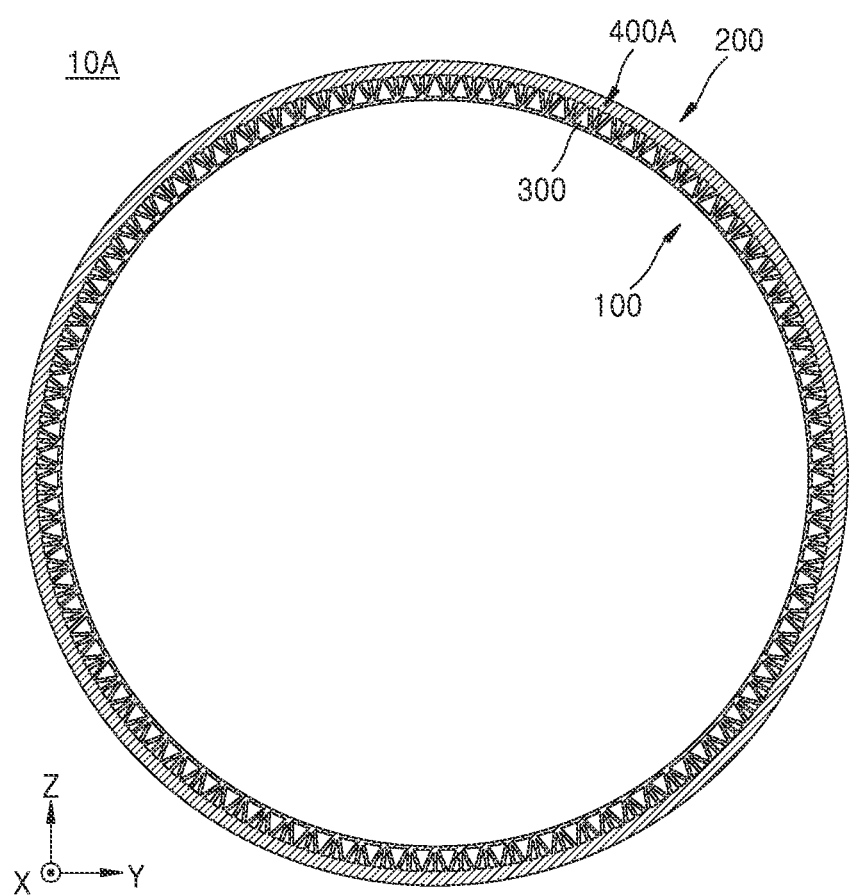
FIG. 6 illustrates a cross-section of a combustor according to a second embodiment of the disclosure.
Figure 7:
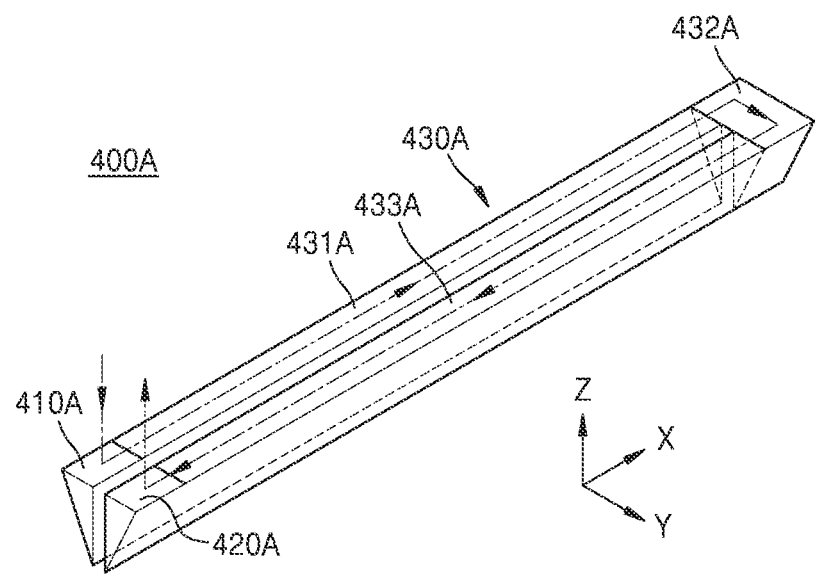
FIG. 7 illustrates an enlarged second heat exchange channel according to the second embodiment of the disclosure.

FIG. 6 illustrates a cross-section of a combustor 10A according to a second embodiment of the disclosure, and FIG. 7 is an enlarged second heat exchange channel 400A according to the second embodiment of the disclosure.

The combustor 10A according to the second embodiment of the disclosure may be different from the combustor 10 according to the first embodiment described above, in terms of some components of the second heat exchange channel 400A. Other components of the combustor 10A according to the second embodiment may be the same as the components of the combustor 10, and their detailed descriptions are omitted.

According to an embodiment, a second heat exchange portion 430A may include a heating portion and a return portion. For example, the heating portion may be a fluid passage extending from a second inlet portion 410A and through which a pressurized gas may flow. The heating portion may directly exchange heat with the combustor 10 to heat the pressurized gas. The heating portion may include at least one heating portion arranged.

The return portion may be arranged at an end of at least one of the plurality of heating portions and may return a moving direction of the pressurized gas to an opposite direction.

In more detail, as illustrated in FIG. 7, the second heat exchange portion 430A may include a first heating portion 431A, a first return portion 432A, and a second heating portion 433A.

The first heating portion 431A may extend from the second inlet portion 410A in a first direction (for example, an X-axis direction of FIG. 7). The pressurized gas introduced from the second inlet portion 410A may move in the first direction along the first heating portion 431A and may exchange heat with an outer circumferential surface of the outer jacket 200 so as to be heated.

According to an embodiment, the first heating portion 431A may be a channel including an inner space having a triangular shaped cross-section. Also, the first heating portion 431A may have a shape in which the first heating portion 431A has an increased cross-sectional area toward an upper portion, that is, toward an inner circumferential surface of the outer jacket 200.

The first return portion 432A may be arranged at an end of the first heating portion 431A and may return the pressurized gas in an opposite direction. That is, as illustrated in FIG. 7, the pressurized gas moving in the first direction along the first heating portion 431A may move in a second direction (for example, a Y-axis direction of FIG. 7) by colliding with a surface of the first return portion 432A. The pressurized gas moving in the second direction may move in the first direction (for example, the X-axis direction of FIG. 7) again by colliding with another surface of the first return portion 432A, so as to be supplied to the second heating portion 433A. Here, the pressurized gas introduced from the first heating portion 431A and the pressurized gas moving to the second heating portion 433A may move in opposite directions to each other on the same axis.

According to an embodiment, the first return portion 432A may have a shape in which the first return portion 432A has an increased cross-sectional area toward an upper portion. For example, as illustrated in FIG. 7, the first return portion 432A may be arranged such that both side surfaces of the first return portion 432A are downwardly inclined and may have a shape in which an end of the first return portion 432A is stopped. Accordingly, the pressurized gas introduced from the first heating portion 431A may move in an opposite direction by sequentially colliding with the both side surfaces of the first return portion 432A and a surface of an end of the first return portion 432A, so as to be introduced into the second heating portion 433A.

The second heating portion 433A may be connected to the first return portion 432A and may extend in the first direction. In more detail, as illustrated in FIG. 7, the second heating portion 433A may be arranged to be apart from the first heating portion 431A. The pressurized gas flowing through the second heating portion 433A may be heated by exchanging heat with the outer circumferential surface of the outer jacket 200.

According to an embodiment, the second heating portion 433A may be arranged in parallel with the first heating portion 431A. Also, a shape of the second heating portion 433A is not particularly limited and may be the same as a shape of the first heating portion 431A.

According to an embodiment, the first heating portion 431A and the second heating portion 433A may be arranged to be apart from each other to form separate fluid passages. Accordingly, the heat exchange may occur not only where the first heating portion 431A and the second heating portion 433A contact the outer jacket 200, but also where the first heating portion 431A and the second heating portion 433A are formed to be apart from each other. Thus, the pressurized gas may be relatively more efficiently heated.

According to an embodiment, the first heating portion 431A and the second heating portion 433A may be arranged to be symmetrical with each other with respect to a center of the first return portion 432A.

According to an embodiment, the first heating portion 431A and the second heating portion 433A may have different sizes and shapes from each other.

According to an embodiment, the second heat exchange channel 400A may be entirely arranged in a lengthwise direction of the combustor 10A. For example, the second inlet portion 410A may be arranged at a lower portion of the combustor 10A, that is, at the side of the discharge portion 100c, and a second outlet portion 420A may be arranged at an upper portion of the combustor 10A, that is, at the side of the introduction portion 100a. Also, the second heat exchange portion 430A may be arranged between the second inlet portion 410A and the second outlet portion 420A.

Accordingly, the pressurized gas introduced through the second inlet portion 410A may be transferred to the upper portion of the combustor 10A along the first heating portion 431A so as to be heated. Also, the flowing direction of the pressurized gas that is initially heated may be changed to an opposite direction by the first return portion 432A, and the pressurized gas may be transferred to the lower portion of the combustor 10A along the second heating portion 433A so as to be additionally heated. The pressurized gas that is secondly heated may be introduced into the oxidant tank 3 and/or the fuel tank 4 through the second outlet portion 420A.

Alternatively, the second heat exchange channel 400A may be partially arranged on the combustor 10A. For example, the second inlet portion 410A and the second outlet portion 420A may be arranged at an upper portion of the introduction portion 100a, and the first return portion 432A may be arranged at a lower portion of the introduction portion 100a.

According to an embodiment, the second heat exchange channel 400A may be alternately arranged with the first heat exchange channel 300 in a circumferential direction of the inner wall 100. In more detail, as illustrated in FIG. 7, the first heating portion 431A and the second heating portion 433A of the second heat exchange channel 400A may be arranged between adjacent first heat exchange channels 300.

As described above, according to the combustor 10A according to the second embodiment of the disclosure and the rocket 1 including the same, the heating portion may be split into two, and thus, a heat exchange area between the pressurized gas and the combustor 10A may be increased. Accordingly, the pressurized gas may be relatively more efficiently heated.

Figure 8:
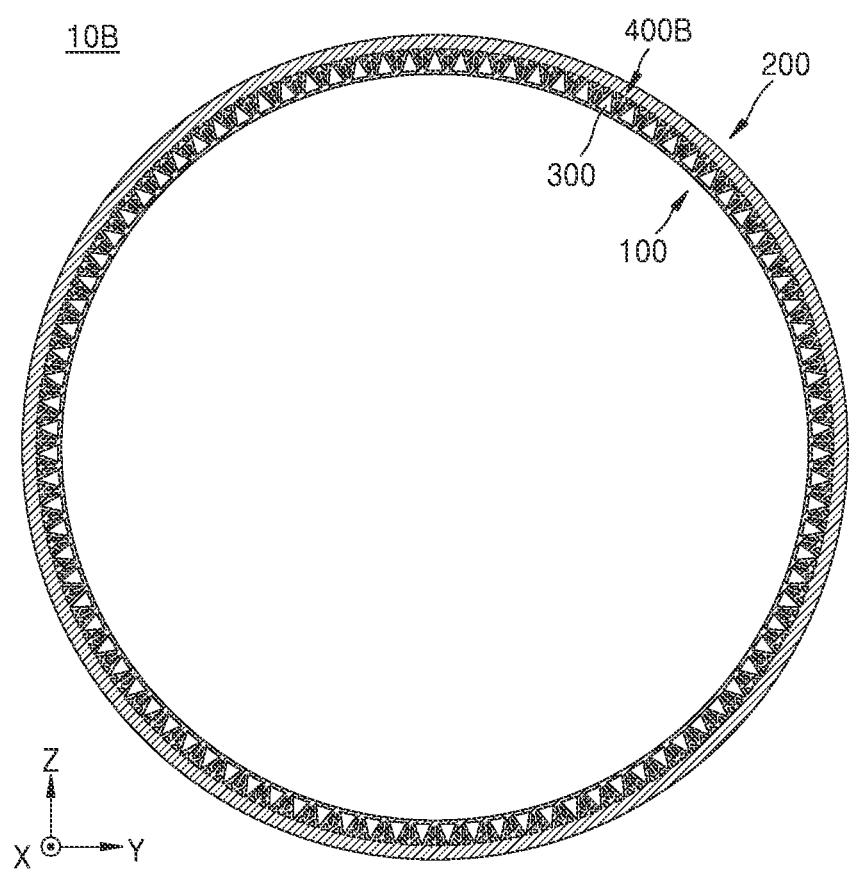
FIG. 8 illustrates a cross-section of a combustor according to a third embodiment of the disclosure.
Figure 9:
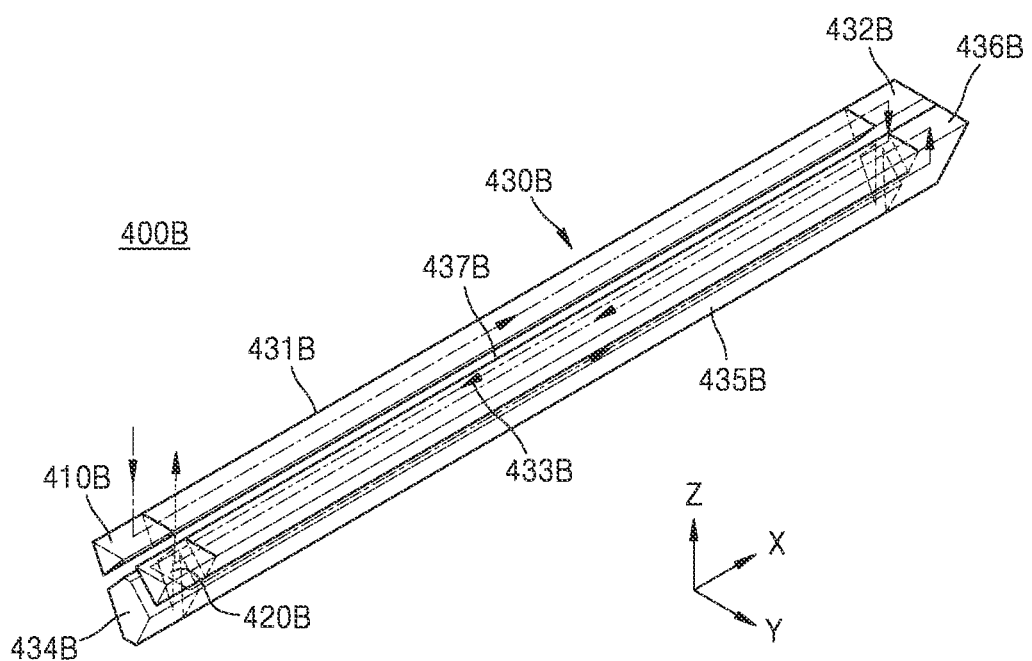
FIG. 9 illustrates an enlarged second heat exchange channel according to the third embodiment of the disclosure.

FIG. 8 illustrates a cross-section of a combustor 10B according to a third embodiment of the disclosure, and FIG. 9 is an enlarged second heat exchange channel 400B according to the third embodiment of the disclosure.

The combustor 10B according to the third embodiment of the disclosure may be different from the combustor 10A according to the second embodiment described above, in terms of some components of the second heat exchange channel 400B. Other components of the combustor 10B according to the third embodiment may be the same as the components of the combustor 10A, and their detailed descriptions are omitted.

According to an embodiment, as illustrated in FIG. 9, a second heat exchange portion 430B may include a first heating portion 431B, a first return portion 432B, a second heating portion 433B, a second return portion 434B, a third heating portion 435B, a third return portion 436B, and a fourth heating portion 437B.

The first heating portion 431B may extend from a second inlet portion 410B in a first direction (for example, an X-axis direction of FIG. 9). A pressurized gas introduced through the second inlet portion 410B may move in the first direction along the first heating portion 431B and may exchange heat with an outer circumferential surface of the outer jacket 200 so as to be heated.

According to an embodiment, the first heating portion 431B may be a channel including an inner space having a triangular shaped cross-section. Also, the first heating portion 431B may have a shape in which the first heating portion 431B has an increased cross-sectional area toward an upper portion, that is, toward an inner circumferential surface of the outer jacket 200.

The first return portion 432B may be arranged at an end of the first heating portion 431B and may return the pressurized gas in an opposite direction. That is, as illustrated in FIG. 9, the pressurized gas moving in the first direction along the first heating portion 431B may move in a third direction (for example, a Z-axis direction of FIG. 9) by colliding with a surface of the first return portion 432B. The pressurized gas moving in the third direction may move in the first direction (for example, the X-axis direction of FIG. 9) again by colliding with another surface of the first return portion 432B, so as to be supplied to the second heating portion 433B. Here, the pressurized gas introduced from the first heating portion 431B and the pressurized gas moving to the second heating portion 433B may move in opposite directions to each other on the same axis.

According to an embodiment, the first return portion 432B may have a shape in which the first return portion 432B has an increased cross-sectional area toward an upper portion. For example, as illustrated in FIG. 9, the first return portion 432B may have a shape of a trigonal prism in which a side surface of the first return portion 432B is downwardly inclined. Accordingly, the pressurized gas introduced from the first heating portion 431B may move in an opposite direction by sequentially colliding with the surfaces of the first return portion 432B, so as to be introduced into the second heating portion 433B.

The second heating portion 433B may be connected to the first return portion 432B and may extend in the first direction. In more detail, as illustrated in FIG. 9, the second heating portion 433B may extend from the first return portion 432B in the first direction and may be arranged in parallel with the first heating portion 431B. The pressurized gas flowing through the second heating portion 433B may be heated by exchanging heat with an outer circumferential surface of the outer jacket 200.

FIG. 9 illustrates that the second heating portion 433B is arranged at a lower portion of the first heating portion 431B and has a triangular shape. However, the shape of the second heating portion 433B is not particularly limited. For example, like the first heating portion 431B, the second heating portion 433B may also have a shape in which a cross-sectional area of the second heating portion 433B is increased toward an upper portion.

The second return portion 434B may be connected to an end of the second heating portion 433B. As illustrated in FIG. 9, the pressurized gas moving in the first direction along the second heating portion 433B may move in a second direction (for example, a Y-axis direction of FIG. 9) by colliding with a surface of the second return portion 434B. The pressurized gas moving in the second direction may move in the first direction (for example, the X-axis direction of FIG. 9) again by colliding with another surface of the second return portion 434B, so as to be supplied to the third heating portion 435B. Here, the pressurized gas introduced from the second heating portion 433B and the pressurized gas moving to the third heating portion 435B may move in opposite directions to each other on the same axis.

The third heating portion 435B may be connected to the second return portion 434B and may extend in the first direction. In more detail, as illustrated in FIG. 9, the third heating portion 435B may extend from the second return portion 434B in the first direction and may be arranged in parallel with the second heating portion 433B. The pressurized gas flowing through the third heating portion 435B may be heated by exchanging heat with the outer circumferential surface of the outer jacket 200.

A shape of the third heating portion 435B is not particularly limited and may be the same as a shape of the second heating portion 433B.

The third return portion 436B may be connected to an end of the third heating portion 435B. As illustrated in FIG. 9, the pressurized gas moving in the first direction along the third heating portion 435B may move in the third direction (for example, the Z-axis direction of FIG. 9) by colliding with a surface of the third return portion 436B. The pressurized gas moving in the third direction may move in the first direction (for example, the X-axis direction of FIG. 9) again by colliding with another surface of the third return portion 436B, so as to be supplied to the fourth heating portion 437B. Here, the pressurized gas introduced from the third heating portion 435B and the pressurized gas moving to the fourth heating portion 437B may move in opposite directions to each other on the same axis.

The fourth heating portion 437B may be connected to the third return portion 436B and may extend in the first direction. In more detail, as illustrated in FIG. 9, the fourth heating portion 437B may extend from the third return portion 436B in the first direction and may be arranged in parallel with the third heating portion 435B. The pressurized gas flowing through the fourth heating portion 437B may be heated by exchanging heat with the outer circumferential surface of the outer jacket 200. A shape of the fourth heating portion 437B is not particularly limited and may be the same as a shape of the first heating portion 431B.

Accordingly, the pressurized gas introduced through the second inlet portion 410B may flow through the first heating portion 431B, the second heating portion 433B, the third heating portion 435B, and the fourth heating portion 437B to exchange heat with the combustor 10B so as to be heated, and then, may be discharged through a second outlet portion 420B. The discharged pressurized gas may be introduced into the oxidant tank 3 and/or the fuel tank 4, to maintain the internal pressure at a level greater than or equal to a predetermined level.

According to an embodiment, the first heating portion 431B, the second heating portion 433B, the third heating portion 435B, and the fourth heating portion 437B may be arranged to be apart from each other. In more detail, as illustrated in FIG. 9, the first heating portion 431B, the second heating portion 433B, the third heating portion 435B, and the fourth heating portion 437B may be arranged to be apart from each other by a predetermined distance, and thus, the heating portions may form separate heat exchange portions. Also, the heating portions may exchange heat with spaces apart from each other. Thus, the heat exchange area may be further increased, and thus, the pressurized gas may be relatively more efficiently heated.

According to an embodiment, the first heating portion 431B and the fourth heating portion 437B may be arranged to be symmetrical with each other. Also, the second heating portion 433B and the third heating portion 435B may be arranged to be symmetrical with each other.

According to an embodiment, the first heating portion 431B, the second heating portion 433B, the third heating portion 435B, and the fourth heating portion 437B may have different sizes and shapes from each other.

According to an embodiment, the second heat exchange channel 400B may be entirely arranged in a lengthwise direction of the combustor 10B. For example, the second inlet portion 410B may be arranged at a lower portion of the combustor 10B, that is, at the side of the discharge portion 100c, and the second outlet portion 420B may be arranged at an upper portion of the combustor 10B, that is, at the side of the introduction portion 100a. Also, the second heat exchange portion 430B may be arranged between the second inlet portion 410B and the second outlet portion 420B.

Accordingly, the pressurized gas introduced through the second inlet portion 410B may be transferred to the upper portion of the combustor 10B along the first heating portion 431B so as to be heated. Also, the flowing direction of the heated pressurized gas may be changed to an opposite direction by the first return portion 432B, and the pressurized gas may be transferred to the lower portion of the combustor 10B along the second heating portion 433B so as to be additionally heated. The flowing direction of the heated pressurized gas may be changed to an opposite direction again by the second return portion 434B, and the pressurized gas may be transferred to the upper portion of the combustor 10B along the third heating portion 435B so as to be additionally heated. The flowing direction of the heated pressurized gas may be changed to an opposite direction once again by the third return portion 436B, and along the fourth heating portion 437B, the pressurized gas may be introduced to the oxidant tank 3 and/or the fuel tank 4 through the second outlet portion 420B.

Alternatively, the second heat exchange channel 400B may be partially arranged on the combustor 10B. For example, the second inlet portion 410B and the second outlet portion 420B may be arranged at an upper portion of the introduction portion 100a, the first return portion 432B and the third return portion 436B may be arranged at a lower portion of the introduction portion 100a, and the second return portion 434B may be arranged at the upper portion of the introduction portion 100a.

According to an embodiment, the second heat exchange channel 400B may be alternately arranged with the first heat exchange channel 300 in a circumferential direction of the inner wall 100. In more detail, as illustrated in FIG. 9, the first heating portion 431B, the second heating portion 433B, the third heating portion 435B, and the fourth heating portion 437B of the second heat exchange channel 400B may be arranged between adjacent first heat exchange channels 300.

As described above, according to the combustor 10B according to the third embodiment of the disclosure and the rocket 1 including the same, the heating portion may be split into four, and thus, the heat exchange area between the pressurized gas and the combustor 10B may be increased. Thus, the pressurized gas may be further efficiently heated.

Herein, the disclosure is described with reference to the embodiments illustrated in the drawings. However, the descriptions are merely examples. One of ordinary skill in the art may sufficiently understand that various alterations and equivalent other embodiments are possible from the embodiments. Therefore, the true technical protection scope of the disclosure shall be defined based on the following claims.

Specific technical configurations described in the embodiments are only according to the embodiments, and they do not limit the technical range of the embodiments. To briefly and clearly describe the disclosure, descriptions of general technologies and components according to the related art may be omitted. Also, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Also, unless components are specifically mentioned by using terms such as "essential," "important," etc., the components may not be necessarily required for the implementation of the disclosure.

The term "the" or other similar referring expressions used in the detailed description of the disclosure and the claims may refer to both of a singular element and a plural element, unless defined particularly either way. In addition, when a range is described in an embodiment, the disclosure includes an application of each of separate values within the range (unless otherwise described), and it is the same as a case where each of the separate values within the range is described in the description of the disclosure. Furthermore, unless orders or opposite orders are apparently described with respect to operations included in a method according to an embodiment, the operations may be performed in appropriate orders. Embodiments are not necessarily limited to the described orders of the operations. The use of all examples and example terms (for example, "etc.") in an embodiment is merely to describe the embodiment in detail, and unless defined so in the claims, the examples and the example terms do not limit the scope of the embodiment. Also, one of ordinary skill in the art may understand that various modifications, combinations, and alterations may be included according to design conditions and factors within the scope of the attached claims and their equivalents.

INDUSTRIAL APPLICABILITY

The disclosure may be used in the industrial field of combustors and rockets.

What is claimed is:
1. A combustor comprising:
an inner wall;
an outer jacket arranged to cover an outer surface of the inner wall;
a plurality of first heat exchange channels arranged between the inner wall and the outer jacket and through which a fuel introduced from a fuel tank flows; and
a second heat exchange channel arranged between the inner wall and the outer jacket and through which a pressurized gas introduced from a pressurized gas tank flows;
wherein the second heat exchange channel comprises:
a second inlet portion through which the pressurized gas from the pressurized gas tank is introduced,
a second outlet portion through which the pressurized gas which is introduced from the second inlet portion and heated is discharged, a second heat exchange portion extending between the second inlet portion and the second outlet portion and at which a heat exchange is performed between the pressurized gas and the combustor, a plurality of heating portions extending from the second inlet portion and through which the pressurized gas flows, and a plurality of return portions, wherein the plurality of return portions are respectively disposed at an end of a first heating portion connected to the second inlet portion, at an end of a second heating portion connected to the second outlet portion, and at an end of one or more heating portions between the first heating portion and the second heating portion, wherein each of the plurality of return portions redirects a moving direction of the pressurized gas in the opposite direction.

2. The combustor of claim 1, wherein the first heat exchange channel comprises:
a first inlet portion through which the fuel from the fuel tank is introduced;
a first outlet portion through which the fuel which is introduced from the first inlet portion and cooled is discharged; and
a first heat exchange portion extending between the first inlet portion and the first outlet portion and at which a heat exchange is performed between the fuel and the combustor.

3. The combustor of claim 1, wherein the first heat exchange channel has a shape in which a cross-sectional area of the first heat exchange channel is increased toward an outer circumferential surface of the inner wall.

4. The combustor of claim 1, wherein the first heating portion and the second heating portion are arranged to be apart from each other to form separate fluid passages and to be symmetrical with each other with respect to a center of the first return portion.

5. The combustor of claim 1, wherein the first heating portion, the second heating portion, the third heating portion, and the fourth heating portion are arranged to be apart from each other to form separate fluid passages.

6. The combustor of claim 1, wherein the second heat exchange channel has a shape in which a cross-sectional area of the second heat exchange channel is increased toward an inner circumferential surface of the outer jacket.

7. The combustor of claim 1, wherein the first heat exchange channel and the second heat exchange channel are alternately arranged with each other in a circumferential direction of the inner wall.

8. A rocket comprising an oxidant tank storing an oxidant, a fuel tank storing a fuel, a pressurized gas tank arranged in at least one of the oxidant tank and the fuel tank and storing a pressurized gas, and a combustor, wherein the combustor comprises:
an inner wall;
an outer jacket arranged to cover an outer surface of the inner wall;
a plurality of first heat exchange channels arranged between the inner wall and the outer jacket, through which the fuel introduced from the fuel tank flows, and through which the fuel exchanging heat with the combustor is discharged to the fuel tank; and a second heat exchange channel arranged between the inner wall and the outer jacket, through which the pressurized gas introduced from the pressurized gas tank flows, and through which the pressurized gas exchanging heat with the combustor is discharged to the pressurized gas tank;

wherein the second heat exchange channel comprises:
a second inlet portion through which the pressurized gas from the pressurized gas tank is introduced,
a second outlet portion through which the pressurized gas which is introduced from the second inlet portion and heated is discharged,
a second heat exchange portion extending between the second inlet portion and the second outlet portion and at which a heat exchange is performed between the pressurized gas and the combustor,
a plurality of heating portions extending from the second inlet portion and through which the pressurized gas flows, and
a plurality of return portions, wherein the plurality of return portions are respectively disposed at an end of a first heating portion connected to the second outlet portion and at an end of one or more heating portions between the first heating portion and the second heating portion,
wherein each of the plurality of return portions each redirects a moving direction of the pressurized gas in the opposite direction.

9. The rocket of claim 8, wherein the first heat exchange channel comprises:
a first inlet portion through which the fuel from the fuel tank is introduced;
a first outlet portion through which the fuel which is introduced from the first inlet portion and cooled is discharged; and
a first heat exchange portion extending between the first inlet portion and the first outlet portion and at which a heat exchange is performed between the fuel and the combustor.

10. The rocket of claim 8, wherein the first heat exchange channel has a shape in which a cross-sectional area of the first heat exchange channel is increased toward an outer circumferential surface of the inner wall.

11. The rocket of claim 8, wherein the first heating portion and the second heating portion are arranged to be apart from each other to form separate fluid passages and to be symmetrical with each other with respect to a center of the first return portion.

12. The rocket of claim 8, wherein the first heating portion, the second heating portion, the third heating portion, and the fourth heating portion are arranged to be apart from each other to form separate fluid passages.

13. The rocket of claim 8, wherein the second heat exchange channel has a shape in which a cross-sectional area of the second heat exchange channel is increased toward an inner circumferential surface of the outer jacket.

14. The rocket of claim 8, wherein the first heat exchange channel and the second heat exchange channel are alternately arranged with each other in a circumferential direction of the inner wall.

* * * * *